United States Patent [19]

Seal et al.

[11] Patent Number: 4,543,548

[45] Date of Patent: Sep. 24, 1985

[54] COAXIAL TRANSMISSION LINE HAVING AN EXPANDABLE AND CONTRACTIBLE BELLOWS

[75] Inventors: William W. Seal, Covina; Laddie A. Basa, Claremont, both of Calif.

[73] Assignee: Andrew Corporation, Orland Park, Ill.

[21] Appl. No.: 595,238

[22] Filed: Apr. 2, 1984

[51] Int. Cl.$^4$ ............... H01P 1/30; H01P 3/06; F16L 51/02

[52] U.S. Cl. ................. 333/243; 138/120; 285/226; 333/260

[58] Field of Search ............... 333/243, 244, 245, 260; 285/115, 226, 47; 138/113, 114, 120, 155

[56] References Cited

U.S. PATENT DOCUMENTS

| | | | |
|---|---|---|---|
| 311,178 | 1/1885 | Duffy | 285/226 |
| 2,740,826 | 4/1956 | Bondon | 333/243 X |
| 2,934,586 | 4/1960 | Gesell | 333/243 X |
| 3,250,297 | 5/1966 | Mooneyham | 138/113 |
| 3,353,846 | 11/1967 | Peyton | 285/226 X |
| 4,350,372 | 9/1982 | Logsdon | 285/226 X |

FOREIGN PATENT DOCUMENTS 10321 of 1887 United Kingdom ............... 285/226

OTHER PUBLICATIONS

Andrew Corporation Catalog 24, 1966, p. 77.
Andrew Corporation Catalog 32, 1983, pp. 160 to 162.

Primary Examiner—Paul Gensler
Attorney, Agent, or Firm—Leydig, Voit & Mayer, Ltd.

[57] ABSTRACT

A rigid coaxial transmission line in which the inner conductor is formed by axially spaced sections. Adjacent sections are connected by a conductive bellows which permits thermal expansion and contraction of the inner conductor sections relative to one another and relative to the outer conductor of the transmission line. A rigid auxiliary connecting member is disposed within the bellows and is slidably connected to one of the conductor sections. The auxiliary connecting member limits expansion and contraction of the bellows to a safe range to prevent the bellows from being overstressed.

7 Claims, 6 Drawing Figures

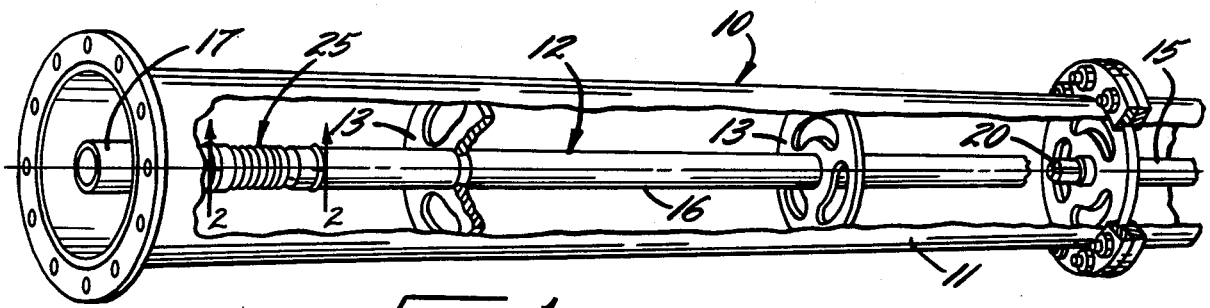
Fig. 1.
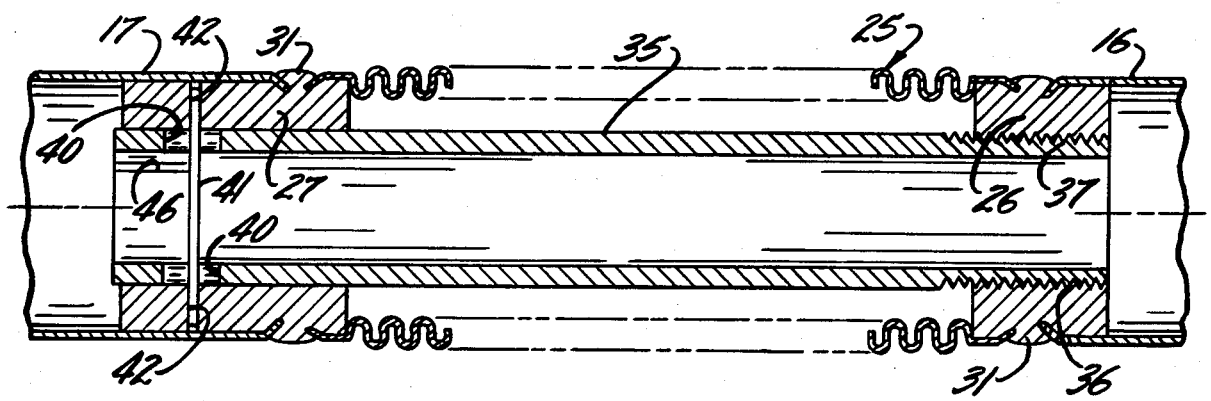
Fig. 2.
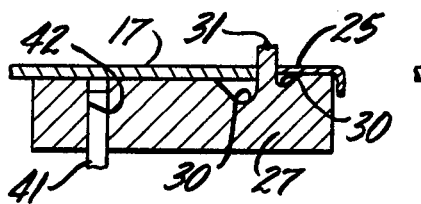 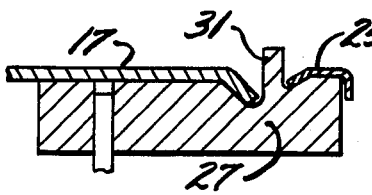 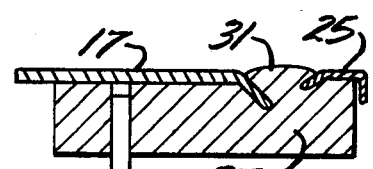
Fig. 3. Fig. 4. Fig. 5.
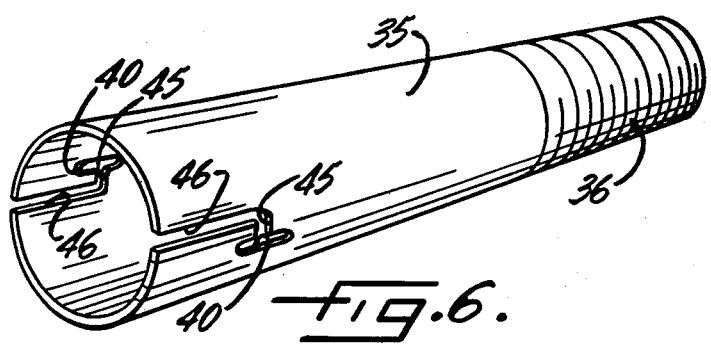
Fig. 6.

COAXIAL TRANSMISSION LINE HAVING AN EXPANDABLE AND CONTRACTIBLE BELLOWS

BACKGROUND OF THE INVENTION

This invention relates generally to an electrical conductor and more particularly to the elongated inner conductor of a rigid coaxial transmission line of the type used in a broadcast antenna feeder system. Such a transmission line conventionally includes a relatively small diameter inner tubular conductor made of copper or the like and telescoped into a substantially larger diameter tubular outer conductor. The inner conductor is coaxial with the outer conductor and is held in spaced relation from the inner wall of the outer conductor by axially spaced insulating discs.

When high power is applied to and removed from the transmission line, the relatively small diameter inner conductor thermally expands and contracts in an axial direction to a greater degree than the outer conductor. To compensate for the differential thermal expansion and contraction, it is conventional to make the inner conductor in the form of multiple axially spaced sections and to couple adjacent ends of adjacent sections with a conductive connecting member which permits the inner sections to expand and contract relative to one another and the outer conductor while still maintaining an electrical joint between the inner sections. In one type of prior transmission line, the intermediate connecting member is a so-called bullet which is coupled to the inner conductor sections with a telescopic sliding fit to permit expansion and contraction. Repeated sliding of the components against one another, however, results in severe mechanical wear, produces metallic particles in the line and ultimately leads to line failure.

In another type of transmission line, an expandable and contractible bellows made of conductive material is connected between adjacent ends of adjacent inner conductor sections. While a bellows eliminates mechanical sliding contact, the previously used bellows is subject to severe sidewise distortion during assembly of the inner and outer conductors and then is subject to being overstressed in tension, compression and/or torsion during service use.

SUMMARY OF THE INVENTION

The general aim of the present invention is to provide a new and improved conductor having a bellows-type connecting member which is uniquely protected against linear and torsional overstressing and which is held in a rigid sidewise position during handling of the inner conductor and during assembly of the inner conductor with the outer conductor.

A more detailed object is to achieve the foregoing by providing a transmission line in which adjacent inner conductor sections not only are connected by an expandible and contractible bellows but also by a novel auxiliary connecting member which limits expansion and contraction of the bellows to a safe range. The auxiliary connecting member also prevents torsional overstressing and sidewise distortion of the bellows.

The invention also resides in the unique construction of the auxiliary connecting member to facilitate assembly of the connecting member with the inner conductor sections.

These and other objects and advantages of the invention will become more apparent from the following detailed description when taken in conjunction with the accompanying drawings.

BRIEF DESCRIPTION OF THE DRAWINGS

FIG. 1 is a perspective view of a rigid transmission line having an inner conductor incorporating the unique features of the present invention, parts of the line being broken away and shown in section.

FIG. 2 is an enlarged fragmentary cross-section taken substantially along the line 2—2 of FIG. 1.

FIGS. 3, 4 and 5 are cross-sectional views showing successive steps by which an end fitting is attached to one of the inner conductor sections and by which the bellows is attached to the end fitting.

FIG. 6 is a perspective view of the auxiliary connecting member.

DETAILED DESCRIPTION OF THE PREFERRED EMBODIMENT

For purposes of illustration, the invention is shown in the drawings in conjunction with a 75 ohm rigid transmission line 10 of the type used, for example, to couple a UHF transmitter with a transmitting antenna. The line which has been shown comprises a rigid tubular outer conductor 11 having a diameter of about 6-$\frac{5}{8}$". Disposed in and coaxial with the outer conductor is a tubular inner conductor 12 made of copper and having a diameter of about 1-$\frac{3}{4}$". Axially spaced insulating discs 13 are located between the two conductors and hold the inner conductor in a centered position within the outer conductor.

To enable the inner conductor 12 to thermally expand and contract relative to the outer conductor 11 when power is applied to and removed from the line 10, the inner conductor is formed as axially spaced sections, there being three axially spaced sections 15, 16, and 17 shown in FIG. 1 of the drawings. The conductor section 15 is coupled to the conductor section 16 by a conductive slidable connector or so-called bullet 20. The bullet 20 comprises two oppositely projecting plugs adapted to telescope into and frictionally grip the conductor section 15 and 16.

An expandable and contractible bellows 25 made of copper extends between and electrically connects the two inner conductor sections 16 and 17 while allowing such sections to shift axially relative to one another. In the present instance, the two ends of the bellows 25 are connected to two tubular end fittings 26 and 27 (FIG. 2) which are made of copper and which are telescoped in and secured to the inner conductor sections 16 and 17, respectively. One method of attaching the bellows and the end fittings to the inner conductor sections is illustrated in FIGS. 3 to 5. As shown, the outer periphery of each fitting is formed with two annular grooves 30 located on opposite sides of a radially projecting rib 31. After one end portion of the bellows and one end portion of one of the inner conductor section have been telescoped over opposite ends of the end fitting (FIG. 3), the metal of those end portions is deformed by a rolling operation and is forced into the grooves 30 (see FIG. 4). Thereafter, the rib 31 is swaged as shown in FIG. 5 and clamps the metal tightly within the grooves.

In accordance with the present invention, the bellows 25 is protected against being overstressed as it expands and contracts and also is protected against sidewise distortion during handling and assembly of the inner conductor 12. For this purpose, a rigid auxiliary connecting member 35 (FIGS. 2 and 5) is disposed within the bellows 25 and extends between the two conductor sections 16 and 17. While the auxiliary connecting member 35 permits free expansion and contraction of the bellows as necessary to accommodate substantial changes in the length of the conductor sections, the auxiliary connecting member also limits such expansion and contraction to a safe range so as to prevent the bellows from being axially overstressed. Moreover, the rigid auxiliary connecting member prevents the bellows from being twisted about its axis and prevents the bellows from being deflected sideways.

More specifically, the preferred auxiliary connecting member 35 is in the form of an elongated tube made of brass. One end portion of the tube 35 is externally threaded at 36 so that the tube may be screwed into and rigidly connected with the tubular end fitting 26, the latter being internally threaded as indicated at 37. Alternatively, the tube may be joined to the end fitting 36 by a silver solder or welded joint.

In carrying out the invention, the opposite end portion of the tube 35 is constructed so as to be capable of sliding through a limited range relative to the end fitting 27 when the bellows 25 expands and contracts. As shown in FIG. 6, the end portion of the tube is formed with two diametrically opposed and axially extending slots 40 each having two closed ends. The slots receive a radially extending pin 41 (FIG. 2) whose end portions project into diametrically opposed holes 42 formed through the end fitting 27. By virtue of the slots 40, the tube 35 is free to shift relative to the end fitting 27 when the bellows expands and contracts. When the pin 41 engages the ends of the slots, however, further expansion and contraction of the bellows is prevented and thus axial overstressing of the bellows is avoided. If there is need for expansion or contraction beyond the range permitted by the tube 35 and the pin 41, such expansion or contraction is permitted by virtue of the conductor section 16 sliding on the bullet 20. It is important to note, however, that such sliding occurs only after expansion or contraction of the bellows has been limited by the tube and the pin and usually will occur at most only once when power is first applied to the line 10 after initial installation. Thus, there is at most only a one-time sliding contact so as to minimize wear and the abrading of metallic particles.

The tube 35, the thread 36 and the pin 41 also form a torsionally and laterally rigid connection between the two end fittings 26 and 27. As a result, the bellows 25 is protected from torsional twisting and lateral deflection during handling of the bellows-connected inner conductor sections 16 and 17 in the manufacturing and assembly plant.

To assemble the bellows 25, the end fittings 26 and 27, the tube 35 and the pin 41 with the conductor sections 16 and 17, the pin first is inserted into the holes 42 in the end fitting 27. After the end fitting 27 and the bellows 25 have been telescoped respectively into and over the conductor section 17, the previously described rolling and swaging operations are performed to anchor the end fitting and the bellows to the conductor section. During the rolling and swaging operations, an inner mandrel (not shown) is inserted into the end fitting 27 from the bellows end thereof in order to provide central support for the end fitting.

The tube 35 then is threaded into the end fitting 26. To facilitate assembly of the tube with the end fitting 27, a circumferentially extending slot 45 (FIG. 6) is formed through the tube adjacent each axial slot 40 and intersects the axial slot. A second axially extending slot 46 is formed through the tube in intersecting relation with each circumferential slot 45 and opens axially out of the end of the tube. With this arrangement, the tube may be inserted axially into the end fitting 27 with the slots 46 alined with the pin 41 so as to receive the pin. After being fully inserted axially, the tube is turned angularly to cause the pin to pass through the circumferential slots 45 and to enter the axial slots 40. Ultimately, the spring action of the bellows 25 maintains the pin 41 and the slots 40 in registering relation.

The final step in the assembly operation is to connect the bellows 25 and the end fitting 26 to the conductor section 16 by the rolling and swaging operation described above. During that operation, a central support mandrel (not shown) is inserted through the conductor section 16 and into the end fitting 26.

From the foregoing, it will be apparent that the tube 35 guards against overstressing and distortion of the bellows 25. At the same time, a non-sliding joint is maintained between the bellows and the end fittings 26 and 27. Those familiar with the art will appreciate that the bellows and tube construction could be associated directly with the bullet 20. Also, a two-piece tube could be fastened rigidly to both end fittings 26 and 27 and formed with an intermediate connection permitting relative sliding of the two tube pieces through a limited range.

We claim:

1. A conductor comprising first and second elongated conductor sections made of conductive material and spaced axially from one another, an expandable and contractible bellows made of conductive material extending between and joined to adjacent ends of said conductor sections to permit relative expansion and contraction of said conductor sections, an axially rigid connector member disposed within said bellows, said connector member extending between and being joined to the ends of said conductor sections by means of a torsionally and laterally rigid connection protecting said bellows from torsional twisting and lateral deflection, and means permitting said member to float axially relative to one of said connector sections but only through a limited range thereby to limit expansion and compression of said bellows to said range.

2. A conductor comprising first and second elongated conductor sections made of conductive material and spaced axially from one another, an expandable and contractible bellows made of conductive material extending between and joined to adjacent ends of said conductor sections to permit relative expansion and contraction of said conductor sections, an axially rigid connector member disposed within said bellows, with one end portion of said connector member being telescoped with one end portion of said one conductor section, and means permitting said connector member to float axially relative to one of said conductor sections but only through a limited range thereby to limit expansion and compression of said bellows to said range, said means comprising a pin-and slot connection between the telescoped end portions of said connector member and said one conductor section, the slot of said connection receiving the pin of said connection, being axially elongated to permit axial floating of said connector member relative to said one conductor section, and having closed ends engageable with said pin to limit axial floating of said connector member relative to said one conductor section.

3. A conductor as defined in claim 2 in which said conductor sections are tubular, said one end portion of said connector member also being tubular and being telescoped into said one end portion of said one conductor section, said pin being fixed within and extending radially of said one end portion of said one conductor section, and said slot being formed through and extending axially of said one end portion of said connector member and receiving said pin.

4. A conductor as defined in claim 3 further including a second slot formed through said one end portion of said connector member and extending circumferentially from said first slot, said second slot intersecting said first slot, and a third slot formed through said one end portion of said connector member, said third slot extending axially of said connector member and being spaced circumferentially from said first slot, said third slot having an inner end intersecting said second slot and having an outer end opening out of the end of said connector member, said connector member being connectable with said pin by moving said connector member axially relative to said pin to cause said pin to enter said third slot and then by turning said connector member relative to said pin to cause said pin to move through said second slot and to enter said first slot.

5. A coaxial transmission line comprising an elongated rigid tubular outer conductor, an elongated rigid inner conductor disposed within said outer conductor, said inner conductor being defined by first and second axially spaced sections, and means establishing an electrical connection between said first and second sections of said inner conductor while permitting said first and second sections to expand and contract lengthwise relative to one another and within said outer conductor, said means comprising first and second end fittings made of conductive material and attached rigidly to adjacent ends of said first and second inner conductor sections, respectively, an expandable and contractible bellows made of conductive material extending between and joined rigidly to said end fittings, an axially rigid connector member disposed within said bellows and extending between said end fittings, first and second means fastening the end portions of said connector member to said first and second end fittings, respectively, said second fastening means permitting said connector member to float axially relative to said second conductor section but only through a limited range thereby to limit expansion and contraction of said bellows to said range.

6. A coaxial transmission line as defined in claim 5 in which each of said inner conductor sections is tubular, said first and second end fittings also being tubular and being telescoped within and fixed rigidly to said first and second conductor sections, respectively, said connector member being telescoped into said end fittings, said first fastening means connecting one end portion of said connector member rigidly to said first end fitting, and said second fastening means connecting the other end portion of said connector member to said second end fitting in such a manner as to permit said connector member to slide axially relative to said second end fitting through said limited range.

7. A coaxial transmission line as defined in claim 6 in which said second fastening means comprise a pin-and-slot connection between said second end fitting and the telescoped end portion of said connector member, the slot of said connection receiving the pin of said connection, being axially elongated to permit axial floating of said connector member relative to said second end fitting, and having closed ends engageable with said pin to limit axial floating of said connector member relative to said second end fitting.

* * * * *